US012415870B2

(12) United States Patent
Van Herwijnen et al.

(10) Patent No.: US 12,415,870 B2
(45) Date of Patent: Sep. 16, 2025

(54) AQUEOUS RESIN COMPOSITION AND USE AS BINDER IN FIBRE-BASED PRODUCTS

(71) Applicant: Metadynea Austria GmbH, Krems (AT)

(72) Inventors: Hendrikus W. G. Van Herwijnen, Hausleiten/Goldgeben (AT); Wolfgang Kantner, Schwarzenau (AT); Arianna Lucia, Vienna (AT); Thomas Rosenau, Vienna (AT)

(73) Assignee: KREMSCHEM AUSTRIA GMBH, Krems an der Donau (AT)

( * ) Notice: Subject to any disclaimer, the term of this patent is extended or adjusted under 35 U.S.C. 154(b) by 598 days.

(21) Appl. No.: 17/909,401

(22) PCT Filed: Mar. 5, 2021

(86) PCT No.: PCT/EP2021/055657
§ 371 (c)(1),
(2) Date: Sep. 5, 2022

(87) PCT Pub. No.: WO2021/176087
PCT Pub. Date: Sep. 10, 2021

(65) Prior Publication Data
US 2023/0086035 A1 Mar. 23, 2023

(30) Foreign Application Priority Data
Mar. 5, 2020 (EP) .................... 20161303

(51) Int. Cl.
C08B 15/00 (2006.01)
C08B 15/02 (2006.01)
C08J 5/04 (2006.01)
C08K 5/544 (2006.01)

(52) U.S. Cl.
CPC ............ C08B 15/005 (2013.01); C08B 15/02 (2013.01); C08J 5/043 (2013.01); C08K 5/544 (2013.01); C08J 2301/04 (2013.01)

(58) Field of Classification Search
CPC ........ C08B 15/005; C08B 15/02; C08J 5/043; C08K 5/544
See application file for complete search history.

(56) References Cited

U.S. PATENT DOCUMENTS 2,758,111 A 8/1956 Roth
7,879,994 B2 * 2/2011 Buchanan ............ A61K 9/4891
536/124

FOREIGN PATENT DOCUMENTS

| CN | 106928375 A | 7/2017 |
| EP | 2615128 A1 | 7/2013 |
| RU | 2614272 C2 | 3/2017 |
| RU | 2618724 C2 | 5/2017 |
| RU | 2700056 C1 | 9/2019 |
| SU | 1109171 A1 | 8/1984 |
| WO | 2009080696 A2 | 7/2009 |

* cited by examiner

Primary Examiner — Jonathan S Lau
(74) Attorney, Agent, or Firm — HOYNG ROKH MONEGIER B.V.; David P. Owen

(57) ABSTRACT

The invention relates to an aqueous resin composition and a method for the manufacture of an aqueous resin composition which resin is a reaction product of an oxidised polysaccharide and a crosslinking agent, which oxidised polysaccharide is an oxidised cellulose comprising aldehyde groups, which crosslinking agent comprises two or more groups reactive with the aldehyde groups, wherein the aldehyde groups in the resin in the aqueous resin composition are in hydrated or un-hydrated form and are at least partly converted to inter- or intramolecular hemiacetals, wherein the resin is dispersed and/or dissolved but not gelled. The invention also relates to the use of this composition for a binder in inorganic fibres products.

27 Claims, 1 Drawing Sheet

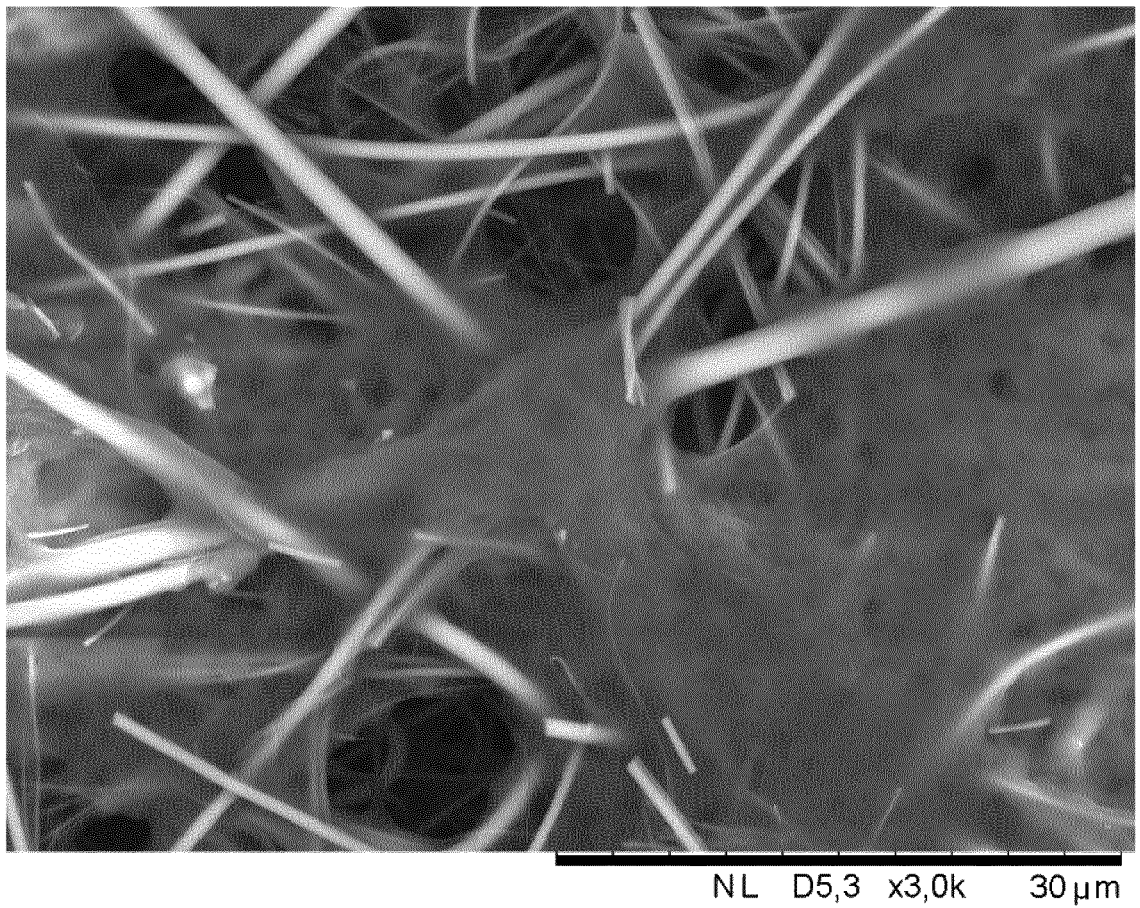

AQUEOUS RESIN COMPOSITION AND USE AS BINDER IN FIBRE-BASED PRODUCTS

BACKGROUND OF THE INVENTION

1. Field of the Invention

The invention relates to fibre-based products comprising fibres, in particular inorganic fibres, and a resin binder and to use of the fibre-based products. The invention also relates to a novel aqueous resin composition comprising a resin in water for use as binder in fibre-based products and a process for the preparation of the novel aqueous resin composition.

2. Description of the Related Art

WO2009081264 describes water dilutable binder resins for binding inorganic fibres, such as mineral wool products. The aqueous resin composition comprises a water dilutable resin which is a reaction product of aromatic hydroxyl compound and an aldehyde and proteinaceous material.

There is pressure to improve traditional phenol-formaldehyde (PF) resins used as binders for inorganic fibre materials such as mineral wool because of stricter environmental regulations concerning phenol and formaldehyde emissions during the production and use of the inorganic fibre materials. Furthermore, the raw materials to produce a PF resin are derived from fossil resources, and it is desirable to introduce components derived from renewable resources for sustainability and economic reasons. In WO2009081264, proteins have been suggested as such a renewable resource to replace part of the phenol-formaldehyde. However, the prior art binder is still based on phenol formaldehyde and has the related disadvantages as described and comprises only a relatively low amount of renewable material.

Therefore, a desire remains to provide an aqueous resin composition that is suitable for use as a binder in fibre-based products and that does not have one or more of the mentioned disadvantages, and that on the other hand has acceptable mechanical and chemical properties when applied in a fibre-based product, in particular a good strength in wet conditions.

BRIEF SUMMARY OF THE INVENTION

The present invention addresses at least one these problems by providing an aqueous resin composition comprising a resin in water, which resin is a reaction product of an oxidised polysaccharide and a crosslinking agent,
  a) which oxidised polysaccharide is an oxidised cellulose comprising between 3 and 12.2, preferably between 7.4 and 11.1 mmole of aldehyde groups per gram cellulose,
  b) which crosslinking agent comprises two or more groups reactive with the aldehyde groups,
  c) wherein the aldehyde groups in the resin in the aqueous resin composition are in hydrated or un-hydrated form and are at least partly converted to inter- or intramolecular hemiacetals,
  d) wherein the resin is dispersed and/or dissolved but not gelled.

It was surprisingly found that a resin in the aqueous resin composition that is largely formed from renewable resources, shows a good adhesion to glass and metal and has a surprisingly good water resistance, resulting in fibre-based products with a high wet strength as illustrated in the examples described below. Oxidised polysaccharide is also referred to as polysaccharide-aldehyde.

In another aspect, the invention relates to a process for the manufacture of the aqueous resin compositions according to the invention and to the aqueous resin compositions obtainable by the process comprising the steps of
  a) Providing oxidised cellulose,
  b) Solubilising the oxidised cellulose in water at elevated temperature,
  c) adding the crosslinker,
  d) raising the temperature to allow the oxidised cellulose and the crosslinker to react and form the resin,
  e) Cooling,
  f) Optionally adding further additives,
  g) Optionally adjusting the pH range, if needed, to a final pH from 7 to 3.

In another aspect, the invention relates to the use of the aqueous resin compositions according to the invention as an adhesive or binder for fibres, wherein the fibres preferably are inorganic fibres and are more preferably selected from the group of stone fibres, glass fibres, rock fibres, slag fibres, and mineral fibres.

Further, the invention relates to a process for the manufacture of fibre-based products comprising fibres and a binder, comprising the steps of a) contacting fibres with an aqueous resin composition according to the invention, b) forming the fibres to a fibre product before or after contacting step a), followed by c) drying and curing the aqueous resin composition to form a binder.

The invention also relates to the bonded fibre-based products obtainable by this process and their use in insulation materials, hydroponic growing media, filters, air filters, sheets or roof shingles.

In yet another aspect, the invention also relates to the use of the aqueous resin compositions as an adhesive for wood or as binder in wood fibre-based materials, preferably MDF, fibreboard, or in wood laminate materials, preferably laminate beams or multiplex.

U.S. Pat. No. 3,657,066 describes a method for the preparation of a fibre-based product wherein cellulose fibres are oxidised with an alkali metal periodate to form aldehyde groups which are then further oxidised with an alkali metal chlorite to form carboxyl groups and subsequently reacted in acidic medium with a melamine-formaldehyde resin precursor to improve bonding between fibres.

U.S. Pat. No. 3,823,233 discloses a process for preparing pure poly-aldehydes by oxidation of polysaccharides such as starch and cellulose which are used to trap in vivo urea, ammonia and some other substances from the blood in patients with renal or hepatic failure.

U.S. Pat. No. 3,099,573 describes aqueous solutions or dispersions of oxidised polysaccharide-aminotriazine resins. It is described that gels of the polysaccharide-aminotriazine resins can be used as adhesive, but in particular describes an aqueous solution of oxidised starch-melamine resin for use in the treatment of paper for imparting improved wet strength of paper.

The disclosed prior art polysaccharide aldehyde binders are based on starch and used for the surface modification of paper for which a very different mechanical profile is required. The inventors have found that oxidised starch-based binders result in low-performance binders that are not suitable for high performance materials like mineral wool and wooden boards.

EP2615128 does not relate to an aqueous adhesive binder composition but describes a transparent substrate film of oxidised cellulose fibers and describes adding a compound having a reactive functional group such as amino group to a dispersion liquid containing the cellulose fibers to react with a hydroxyl group, carboxyl group or aldehyde group to provide a coating on the cellulose fibers.

U.S. Pat. No. 2,758,111 does not relate to an aqueous adhesive binder composition but describes a new solid oxycellulose product containing aldehyde groups in the 6-position and a preparation process which comprises contacting solid cellulose with a solution of tert-butyl chromate and acetic acid. It is described that the aldehyde groups can react with e.g. amino groups e.g. for surface coatings and finishes.

CN106928375 does not relate to an aqueous adhesive binder composition but describes a method for preparing a hydrogel by oxidising dialdehyde nano-cellulose by periodate in ethylene glycol which and reacting with chitosan as crosslinker in acetic acid solution to convert it to a hydrogel which is used in medical applications such as for drug delivery systems.

WO2009/080696 describes aqueous adhesive binder composition comprising a mixture of cellulose and a cellulose crosslinker and composites of mineral wool utilizing these compositions as a fiber binder. Hydroxypropylcellulose and carboxymethylcellulose are named as polysaccharides. Oxidation of polysaccharides in peroxide/alkali is described for depolymerising the polysaccharide.

BRIEF DESCRIPTION OF THE DRAWINGS

FIG. 1 presents a SEM photograph image (at ×3000 magnification) of a fibre to fibre bond area in a glass fibre filter comprising a cured oxidised cellulose-melamine resin binder.

DETAILED DESCRIPTION OF THE INVENTION

The aqueous resin composition according to the invention comprises a resin in water, which resin is a reaction product of an oxidised polysaccharide and a crosslinking agent, which oxidised polysaccharide is an oxidised cellulose comprising aldehyde groups, which crosslinking agent comprises two or more groups reactive with the aldehyde groups, wherein the aldehyde groups in the resin in the aqueous resin composition are in hydrated or un-hydrated form and are at least partly converted to inter- or intramolecular hemiacetals and wherein the resin is dispersed and/or dissolved but not gelled. Preferably, the oxidised cellulose comprises C2 and C3 aldehydes. The aldehyde groups introduced in the cellulose cause solubility of the polymer in water by destruction of the hydrogen bond network and crystalline regions of the cellulose.

It is well known to the skilled person what is gelled and what is not gelled. A gel comprises a crosslinked resin network extending throughout the volume of the gel and as a result a gel is not able to flow, whereas a non-gelled adhesive composition does not have a crosslinked resin network throughout the volume of the gel and can flow without breaking the crosslinked network. The gelation point can also be defined in terms of an oscillatory rheometer test to determine the storage modulus G' (elastic contribution, so the "solid part") and the loss modulus G" (viscous contribution or the "fluid part") wherein in case G">G' the state of the material is "liquid" and in case G'>G" the state of the material is a "gel" and G'=G" is the "gel point" i.e. the transition between the two states.

The crosslinking agent preferably is chosen from the group of sorbitol, glycerol, gallic acid, para-methoxy phenol, hydroxylamine hydrochloride, poly-isocyanates or polyamines. Sorbitol and glycerol have the advantage that they are derived from renewable sources. In view of the water resistance and non-toxicity, the crosslinking agent preferably is a polyamine comprising two or more primary amine groups, more preferably selected from the group of urea, melamine and dicyandiamide. Dicyandiamide is a polyamine because it exists in a tautomeric form comprising 2 primary amine groups. In view of reducing a risk of gelation the crosslinking agent is preferably a relatively small molecule, so preferably having a molecular weight below 1000, preferably below 700 and more preferably below 500 g/mol. At a relatively low molecular weight of the crosslinking agent the molecular weight of the oxidised cellulose can be higher and the concentration of the resin in the adhesive composition can be higher without too much risk of gelation and reduced storage stability.

Further, it is preferred to select crosslinkers that do not substantially react with the aldehyde groups at temperatures preferably below 50° C. or 40° C. to avoid premature crosslinking and gel formation.

Although crosslinking in part also occurs without crosslinking agent by inter- or intramolecular hemiacetal formation, the addition of a crosslinking agent was found to be particularly important for obtaining high wet strength and thermal stability. The wet strength of oxidised cellulose binder cured without a crosslinking agent was found to be only 0.11 MPa as compared to 3.78 MPa of the oxidised cellulose binder cured with a crosslinking agent (see Examples). The thermal stability was determined by thermogravimetric analysis scan between 50° C. to 400° C. with a heating rate of 10° C./min in aluminum crucibles under nitrogen. Comparing a binder with oxidised cellulose with and without crosslinkers showed significant increase in residual mass. The residual mass after this heating until 400° C. is at least 50 wt. %, preferably at least 55 wt. % and more preferably at least 60 wt. % and when heating until 300° C. preferably is at least 70 wt. %.

In view of avoiding gelation and poor shelf stability, in particular at low storage temperatures, the aqueous resin composition preferably has a resin solids content from 1-25 wt. % defined as the dry solids weight relative to the total weight of the dry resin solids and water, preferably from 2-20 wt. % and more preferably from 2-15 wt. % Preferably, the content is from 3 wt. % to 10 wt. % and preferably about 4-6 wt. % in view of good flow and wetting of fibres in the manufacture of fibre-based products.

In view of the use in the manufacture of fibre-based products the aqueous resin composition has a viscosity from 4.5 to 10 mPa*s at a solid content from 5 wt. % to 8 wt. % (measured at 20° C. in an Anton Paar rheometer in rotation mode at 200 s$^{-1}$). In case an aqueous resin composition has a resin content outside the 5-8 wt % range required for the viscosity measurement, the water content in the aqueous resin composition is adjusted by dilution or evaporation of water to a solids content in the range 5 wt. % to 8 wt. % solids content range required for the measurement.

In the aqueous resin composition, the amount of crosslinking agent is preferably chosen such that the molar ratio between aldehyde groups in the oxidised cellulose and the crosslinking groups in the crosslinking agent ranges from 10 to 0.1, preferably between 8 and 0.4, more preferably between 7 and 0.7, even more preferably between 5 and 1 or between 4 and 1.2. In case the crosslinker is melamine, the ratio is preferably above 1, more preferably above 1.2 or even above 1.5, in case the crosslinker is urea, the ratio is preferably above 0.5, preferably above 1, more preferably above 1.2 and in case the crosslinker is dicyanamide, the ratio is preferably above 0.5, more preferably above 0.7 or even above 1.0.

It is noted here that the number of aldehyde groups and number of crosslinking groups refer to the original number of reactive groups before reaction. So, in the oxidised cellulose-crosslinking agent resin, the number of aldehyde groups thus includes aldehydes, hydrated aldehydes, aldehydes that are converted by reaction with hydroxy groups to hemi-acetal or hemi-aldal groups (7 membered rings) and aldehydes reacted with crosslinker groups. An excess of aldehyde groups over crosslinking groups (ratio over 1) is preferred in view of avoiding gelation and it is believed that this excess is not very detrimental to the properties because the resin in the resin composition and during curing also forms intra- and inter molecular hemiacetal bonds.

It is preferred that the aqueous resin composition has a final pH from 7 to 3, preferably from 5 to 3, more preferably 4.5 to 3, at the stage when it is used when applied and cured. It is believed that this catalyses crosslinking reaction and intra- and inter molecular hemiacetal bond formation. The dialdehyde cellulose is stable at acidic pH. At too low pH, certainly when lower than 2, hydrolysis will occur and between 2 and 3 gelatinization will occur. At basic pH and certainly at values above 8 or 9, dialdehyde cellulose will hydrolyse and degrade (cleavage of the chains and degradation in compound with C=C bonds) and the resin will have less hemiacetal bonds in the structure.

The aqueous resin composition may further comprise one or more of the components selected from the group of organosilane compounds, hydrophobic agents, anti-microbial agents, flame retardants. Most preferably, in view of achieving good adhesion to inorganic fibres, the aqueous resin composition comprises at least an organosilane compound, preferably an amino-alkoxysilane compound, which adheres well to inorganic fibres and to the binder as the amino group can react with the aldehyde groups of the binder resin. Hydrophobic agents function to make the final fibre product water-repellent and less water sensitive Suitable additives for this purpose are wax emulsions. Flame retardants are desirable for example in heat insulation applications of fibre-based products.

The aqueous resin composition according to the invention is characterised by a wet tensile strength of at least 1 MPa, preferably at least 2, 3, or even at least 3.5 MPa in a glass fibre binder test. In this test, the wet strength is determined by tensile testing a specimen on a Zwick Roell Z20 machine directly after having soaked it into hot water at 80° C. for 3 minutes which specimen is a 8×1 cm dog-bone shape sample cut from a glass fibre filter (MN 85/70 BF filters, Macherey-Nagel, Germany) which has been soaked with the aqueous composition for 5 minutes and, after vacuum-filtering off excess aqueous composition, has been cured in an oven between 170° C. and 200° C. until complete curing.

The aqueous resin composition according to the invention is further characterised in having a high shelf stability, defined as viscosity stability characterised by having a viscosity between 4.5 to 10 mPa*s and substantially no sedimentation for a period of preferably more than 1, preferably more than 2 or even more than 4 weeks (at temperature between 4 and 21° C.).

The aqueous resin composition according to the invention is further characterised in having substantially no emissions of hazardous volatiles before, during, or after curing, especially substantially no formaldehyde or phenol emission as in the state-of-the-art PF resins. The emissions during the curing (volatile compounds) were studied with gas chromatography/mass spectroscopy and there were no formaldehyde formation/emission even during the curing at very high temperatures between 170° C. and 200° C. The fact that the binder resin is based on renewable non-toxic resources is especially important and advantageous for the use in hydroponic growing of vegetables.

The invention also relates to a process for the preparation of the aqueous resin composition according to the invention comprising the steps a) providing oxidised cellulose, b) solubilising the oxidised cellulose in water at elevated temperature, c) adding the crosslinker, d) raising the temperature to allow the oxidised cellulose and the crosslinker to react and form the resin, e) cooling, f) optionally adding further additives, g) optionally, adjusting the pH range, if needed, to a final pH from 7 to 3.

The first step a) in the process is to provide oxidised cellulose. Oxidised cellulose is commercially available but can suitably be made by a process comprising the steps of 1) providing cellulose, 2) contacting the cellulose with a periodate solution to oxidise the cellulose, preferably at a temperature from 20 to 45° C., preferably at a pH between 3 and 7, preferably for a time of at least 20 hours, preferably in the dark, and 3) washing with water. The oxidation of cellulose introduces the aldehyde group and the property of solubility of cellulose in hot water. It was found that a crosslinked binder based on oxidised cellulose has a good water-resistance and strength compared to crosslinked binder based on oxidised starch.

Preferably, the oxidised cellulose comprises C2 and C3 aldehydes, more preferably the aldehyde groups in the oxidised cellulose are substantially only C3 and C4 aldehyde groups, wherein substantially means that preferably 70, 80 or even 90 mole % of the aldehyde groups are C3 or C4 aldehyde groups. The advantage of the abovementioned periodate oxidation method is that it results in a regioselective introduction of C2 and C3 aldehyde oxidised cellulose. The molecular weight of the cellulose is only slightly reduced, but this is due to side reactions and neither intended nor significant. This is an advantage over for example $H_2O_2$ treatment which will introduce all kinds of oxidized groups including keto-groups, C2 and C3 aldehydes and carboxyl groups at C6, in a complete random fashion, and to a relatively low degree. By $H_2O_2$ treatment in alkali the polysaccharide is depolymerised by beta-alkoxy-elimination, which is not preferred.

Preferably, the oxidised cellulose provided in step a) comprises between 3 and 12.2 mmole of aldehyde groups per gram cellulose. However, the upper limit may be lower than the maximum number of 12.2 aldehyde groups because too much or strong oxidation may also decrease molecular weight. It is preferred that at least 80 wt % of the oxidised cellulose has a molecular weight Mw between 1000 and 100.000 g/mol. Therefore, more typically the oxidised cellulose provided in step a) comprises between 7.4 and 11.1 mmole of aldehyde groups per gram cellulose. The aldehyde groups (including those present in other forms) can be quantified by means of titration, for example as published in Cellulose (2017), 24: 2753-2766. A high degree of oxidation, in other words, a large number of aldehyde groups per gram cellulose, is preferred in view of the easier solubilization and denser crosslinking.

Further, the oxidised cellulose provided in step a) of the process for the preparation of the aqueous resin composition, preferably shows 2 peaks in a GPC measurement wherein a first peak corresponds to a first part having a weight average molecular weight Mw of $10^7$-$10^6$ Da and a second peak corresponds to a second part having a weight average molecular weight Mw of $10^4$-$10^3$ Da, wherein the first part is about 1-20, preferably 1-15, more preferably 1-8 wt. % of the total of the first and second part. The molecular weight analysis is performed with a gel permeation chromatography (GPC) coupled with light scattering (LS) and refractive Index (RI) analysers. The two peaks of GPC are obtained with the Light scattering, measuring the scattering intensity of the radius of gyration of the molecule. The concentration instead is calculated with the refractive index analyser, that allows to determine the concentration of the detected particles. The percentage of first and second part are based on peak area of the GPC/RI curve.

In a next step b) the oxidised cellulose is solubilised in water at elevated temperature, preferably in amount between 5 and 30, more preferably 10-25 and even more preferably about 15 ml of water per gram of dry oxidised cellulose, and preferably at a temperature between 80 and 105° C., more preferably between 90 and 103° C., even more preferably between 95 and 103° C. The amount is chosen high enough to achieve a concentrated solution with no or less need to increase concentration afterwards, and on the other hand low enough to more easily dissolve the oxidised cellulose. The temperature is chosen high enough to more easily dissolve the oxidised cellulose but not too high to avoid hydrolysis. To avoid hydrolysis, the solubilisation step b) is preferably done at neutral pH and preferably no acid or base is added in excess of neutral pH. It is required that in the aqueous resin composition, the resin is dispersed and/or dissolved but not gelled. Preferably, the cellulose is dissolved, but it can also be dispersed to some extent. In any case it should not be gelled.

The solubility of the oxidised cellulose increases with the degree of oxidation. Therefore, especially in case of lower cellulose oxidation level, lower oxidised cellulose concentrations are used in view of ease of solubilisation. However, in view of a desired resin concentration for an envisaged application, water may have to be added to dilute or removed after the solubilisation to adjust the concentration of oxidised cellulose to the desired range. In view of the use as binder for fibres, in particular mineral fibre wool application, it is preferred that the oxidised cellulose amount is chosen such that the resulting amount of oxidised cellulose in the aqueous composition is between 1 and 10, preferably between 3 and 8 wt. % (dry oxidised cellulose weight relative to the weight of the aqueous composition) as described in more detail below.

In step c) the crosslinking agent is added to the solubilised oxidised cellulose, preferably in an amount resulting in a molar ratio between aldehyde groups in the oxidised cellulose and the crosslinking groups in the crosslinking agent between 10 to 0.1, preferably between 7 and 0.7 and more preferably between 5 and 1. It may be required to take separate steps to solubilise the crosslinking agent in the oxidised cellulose solution or separately before adding to the composition. For example, when melamine is used as crosslinking agent, the pH is preferably first increased to alkaline range, typically 7-8.5, to dissolve the melamine before raising the temperature to react the components. The addition of the crosslinking agent is preferably done at a low enough temperature to prevent premature crosslinking during the addition of the crosslinker. Therefore, if the temperature in step b) is too high the process comprises a cooling step before step c), preferably to cool to a temperature below 50, 40, or even 30° C.

In step d) the oxidised cellulose and the crosslinker are allowed to react and form the resin, preferably at a temperature from 40° C. to 90° C., preferably 50° C. to 80° C. This typically requires a heating step to raise the temperature of the aqueous solution obtained from step c). It is preferred that the pH is between 2 and 5, preferably between 3 and 4.5 and more preferably between 3.5 and 4 because it was found that a low pH below 5, preferably 4.5 promotes the hemiacetal formation, but the pH should not be too low to avoid gelation.

After reaching the desired conversion, the composition is cooled (step e), and the reaction stops. Preferably, in the process the crosslinking agent is a polyamine and reaction step d) of the oxidised cellulose and the polyamine crosslinker is carried out until substantially all primary amino groups have reacted, as determined by FT-IR spectroscopy analysis, and then the composition is cooled. FT-IR spectroscopy analysis can also be similarly used in case other crosslinking agents are used to determine the point where the desired conversion has been reached in the reaction step d). Alternatively, in the process the reaction step d) of the oxidised cellulose and the crosslinking agent is carried out until the viscosity reaches a set value, preferably between 4.5 to 10 mPa*s and then the composition is cooled.

In the above reaction step d) gelation should be avoided because a gelled aqueous resin composition cannot be used in the manufacture of fibre-based materials as it does not wet the fibres, clogs the openings between the fibres resulting in poor binding, poor strength and reducing permeability of the fibre product. A gelled composition maybe can be resolubilised by addition of water but that is not desirable. Therefore, the reaction is stopped before gelation occurs.

Optionally further additives can be added and mixed into the aqueous composition as described above in any stage of the process but preferably after reaction step d) and more preferably directly after step d) and before cooling step e). Preferably, if needed, so in case the pH of the aqueous composition obtained in step d) is above pH=7, the pH is adjusted to an acidic range to a final pH from 7 to 3, preferably from 5 to 4 because the curing of the aqueous composition favours acidic pH.

Preferably, the water content is adjusted (if needed) to avoid gelation during storage to a resin concentration between 1 and 25, preferably between 2 and 20, more preferably between 3 and 15 and even more preferably between 3 and 10 wt. % (dry resin solids to total weight of the aqueous composition). In case a low resin concentration is desired for the envisaged application, it is advantageous in view of transport cost to choose a high concentration, but still preferably in the range above, and dilute with water shortly before use to the desired concentration for use.

The invention also relates to an aqueous resin composition obtainable by the process as herein described. The invention also relates to the use of the aqueous resin composition as binder for fibres and to a process for the manufacture of fibre-based products comprising fibres and a binder comprising the steps of
   a) contacting fibres with an aqueous resin composition of the invention for example by soaking or spraying
   b) forming the fibres to a fibre product before or after contacting step a), for example a parallel aligned-, knitted-, woven- or non-woven fibre layer, preferably to a non-woven fibre wool layer which typically has a density below 500, 400 or even 300 kg/m$^3$, then
   c) drying and curing the aqueous resin composition to form the binder, preferably at temperatures above 50, but more preferably above 70, 100, 150 or even above 170° C. and typically up to about 200° C.

In the above process, it is preferred that the resin content in the aqueous composition in contacting step a) is 1 to 10 wt. %, preferably 3 to 8 wt. % and typically 4 to 6 wt. % dry resin solids in the aqueous composition and the viscosity is preferably between 4.5 to 10 mPa*s. It was found that this results in (1) an extremely fine spraying with very small droplets which gives a good adhesive distribution, (2) accurate and even dosing of the adhesive content (concentration) on the mineral fibres, (3) possibility to effectively cool mineral fibres e.g. directly after the melt spinning process of the fibres and (4) good flow to the cross junctions resulting in good binding at low binder amounts; i.e. a high binding efficiency.

The invention also relates to a fibre-based product obtainable by a process according to the invention comprising fibres and cured resin according to the invention as a binder, wherein the fibres preferably are inorganic fibres and are more preferably selected from the group of stone fibres, glass fibres, rock fibres, slag fibres, and mineral fibres. The amount of cured binder resin in the fibre-based product can vary between wide ranges depending on the particular end-use of the product, but typically is between 1 and 20 wt. %, preferably between 2 and 15 wt. %, more preferably between 3 and 10 wt. %, and most preferably between 4 and 6 wt. % (wt. % dry solid resin weight relative to the total of the fibres and the resin).

A preferred fibre-based product according to the invention is a non-woven fibre wool layer with a density below 500, 400 or even 300 kg/m³ which is stabilized with between 3 and 10 wt. % of the cured resin according to the invention (wt. % dry solid resin weight relative to the total of the fibres and the resin). The low density of the non-woven fibre wool layer provides very good insulation properties, but on the other hand implies low strength and shape stability. The resin of the invention provides improved strength and shape stability whilst retaining good insulation properties.

It was found that the aqueous resin composition of the invention gives strength to the fibre-based products in a very efficient way, i.e. at low binder resin amounts, because the aqueous resin composition and the resin itself have good wetting properties on the inorganic fibres and the aqueous resin composition is mainly adhered at junction points where fibres touch each other and after curing the crosslinked resin links these fibres together, which gives the material mechanical reinforcement. Moreover, the chemical, physical and thermal resistance of the binder composition improve the resistance of the overall product.

A preferred embodiment is a fibre-based product based on a non-woven fibre layer, preferably a wool, such as mineral wool, rockwool or slag wool etc. The fibres herein typically have an average cross-sectional diameter below 100 microns and these fibre-based products, after curing, preferably contain between 1 and 20 wt. %, preferably between 2 and 15 wt. %, more preferably between 3 and 10 wt. % and most preferably between 4 and 6 wt. % of cured binder. These fibre-based products preferably have a density below 500, preferably below 400, more preferably below 300 kg/m³. The binder provides resilience and strength to the mineral wool product and maintains the low density for longer time during use.

The invention also relates to the use of the fibre-based products of the invention in insulation materials, hydroponic growing media, filters, air filters, sheets or roof shingles.

In an alternative, the invention relates to the use of the aqueous resin composition of the invention as an adhesive for wood or as a binder in wood fibre-based materials, preferably MDF, fibre-board or in wood laminate materials, preferably laminate beams or multiplex.

Referring to FIG. 1, a SEM image (at ×3000 magnification) of a fibre to fibre bond area in a glass fibre filter made with a cured binder comprising oxidised cellulose and polyamine crosslinker, as mentioned in example 4, is shown. The FIGURE shows the fibres of the glass fibre filter as whiteish coloured rods and the cured binder/adhesive as greyish opaque matter. The cured binder/adhesive is present at the junction of the fibres, thus adheres to the fibres, which gives strength to the product.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

EXAMPLES

Example 1: Oxidised Cellulose—Urea Resin

Cellulose was oxidised via periodate ion: 20 g of cellulose was suspended in 1 litre of water, and then a solution of sodium metaperiodate was added to the suspension, in a ratio of 1.25 in moles between the sodium metaperiodate and the anhydroglucose-Unit (AGU) of cellulose. The temperature was set slightly above the room temperature, between 28° C. and 35° C., and the reaction was carried out in the dark for a minimum time of 20 hours, accordingly to the amount of requested degree of oxidation. At the end of the reaction the product is washed with several litres of water and the unreacted oxidiser was washed away. The degree of oxidation can vary, in these conditions, between 7 and 11 mmol/g, namely between 57% and 89%. The product was collected and stored at 4° C. without drying.

70 g of wet oxidised cellulose with a solid content of 16 wt % was dissolved in 200 ml of water for at least 1 hour at high temperature (100° C.) until complete dissolution and concentrated to the desired solid content: the oxidation degree in this example was to an aldehyde amount of 8.7 mmol aldehyde/gr of oxidised cellulose, T was 100° C., time 1.5 h, solid content was 5 wt % of the total composition.

The solution was cooled to 50° C. under mixing and 5 g of urea was added, to achieve a molar ratio of aldehyde groups to urea of 1.17. The ratio in moles between aldehyde groups in the oxidised cellulose and the crosslinking groups in the crosslinking agent is 0.59. The pH was brought to the acidic range to a pH between 4 and 3.5 with acetic acid and the temperature was raised up to at least 70° C. The pH was maintained acidic with acetic acid during the reaction. At the end of the reaction the solution was cooled down and the pH was adjusted to the desired value between pH 4.5-3.5. The reaction time was 7 h. The result is a yellowish viscous solution.

Example 2: Oxidised Cellulose—Melamine Resin

Cellulose was oxidised via periodate ion like described in Example 1. Analysis showed that cellulose was oxidised to an oxidation degree of 9.4 mmol/g and the GPC molecular weight of the major fraction of oxidised material was around 10 kDa. 42.5 g of wet oxidised cellulose with a solid content of 16% was dissolved in 100 ml of water for 1.5 hour at 100° C. until complete dissolution and concentrated to the desired solid content of 5 wt. %.

The solution was cooled to 50° C. under mixing and the pH was brought up into the basic range with sodium hydroxide solution to pH=8-8.5. 1.5 g of Melamine was added in an amount to bring the molar ratio between Aldehyde groups and Melamine to 5.3 and the solution is mixed for 1 hour in total at the basic pH to completely dissolve the melamine. The ratio in moles between aldehyde groups in the oxidised cellulose and the crosslinking groups in the crosslinking agent is 1.79. Then the pH was brought again in acidic range to pH=4.5. Then temperature was raised up to at least 60° C. At the end of the reaction, after a reaction time of 3 hours, the solution was cooled down and the pH was adjusted to the desired final value of pH=5. The result is a white viscous solution.

Example 2a: Oxidised Cellulose—Melamine Resin and Adhesion Promotor

To the solution of example 2, an organosilane adhesion promotor was added (3-aminopropyl)-tri-ethoxy silane (OS) in an amount of 0.25 wt. % based on resin solid weight using a solution of 15% (w/v) of OS in water.

Example 3: Oxidised Cellulose—Dicyandiamide Resin

Cellulose was oxidised via periodate ion like described in Example 1. Analysis shows that more than 50% of cellulose was oxidised and the hemiacetal structure formation occurred after the oxidation. 37.5 g of wet oxidised cellulose with a solid content of 16% was dissolved in 100 ml of water for 1.5 h at 100° C. until complete dissolution and concentrated to the desired solid content. At this point the degree of oxidation was 8.7 mmol/g and the solid content was 4.5 wt. %. The solution was heated up to at least 40-50° C. under mixing.

2 g of dicyandiamide was added to achieve a molar ratio of aldehyde groups: dicyandiamide of 2.2 and the pH was brought into the acidic range (pH=3.5). The ratio in moles between aldehyde groups in the oxidised cellulose and the crosslinking groups in the crosslinking agent is 1.1. The temperature was raised up 60° C. and after 30 minutes to 70° C. The reaction time was 2 h. At the end of the reaction the solution was cooled down to room temperature and the pH was adjusted to the desired value of pH 4. The result is a whitish viscous solution.

Comparative Example A and B

In Comparative Example A, no binder was used. In Comparative Example B, Example 2 was repeated except that no crosslinking agent was added, so the binder was only oxidised cellulose that was hydrated and/or partially converted to inter and intra molecular hemi-acetal bonds.

Comparative Example 1: Oxidised Starch—Urea Resin

Starch was oxidised via periodate ion. Starch was suspended in water and then a solution of sodium metaperiodate was added to the suspension, in a ratio of 1:1 in moles between the sodium metaperiodate and the AGU of starch. The temperature was set slightly above the room temperature, between 28° C. and 35° C. and the reaction was carried out in the dark for 24 hours to achieve the set degree of oxidation. At the end of the reaction, the product is washed with several litres of water and the unreacted oxidiser was washed away. The product was collected and stored at 4° C. without drying. 15.7 g of wet oxidised starch with a solid content of 28.6 wt. % was dissolved in 30 ml of water for at least 30 min at T=60° C. until complete dissolution. The degree of oxidation was 8.6 mmol aldehyde/gr.

A solution of 1.16 g of urea in 30 ml with a concentration of 0.65 mol/litre was added and the pH was brought to the acidic range with acetic acid from pH=7 to a pH of 4. The temperature was raised up to at least 70° C. The pH was maintained acidic during the reaction. At the end of the reaction, after reaction time of 2 hours, the solution was cooled down and the pH was adjusted to the desired final value pH=4.5. The result is a whitish viscous solution.

Comparative Example 2: Oxidised Starch—Melamine Resin

Starch was oxidised via periodate ion like described in Comparative Example 1. Analysis shows that more than 50% of starch was oxidised. 15.7 g of wet oxidised starch with a solid content of 28.6 wt. % was dissolved in 60 ml of water for at least 30 min at T=60° C. until complete dissolution. An amount of 1 g of Melamine was added, and the pH was brought in the basic range at pH=8. The temperature was raised up to at least 70° C. Then the pH was reduced to the acidic range at pH=5. At the end of the reaction, after reaction time of 2 hours, the solution was cooled down and the pH was adjusted to the desired value of pH=4.7. The result is a white viscous solution.

Comparative Example 3: Phenol-Formaldehyde Resin

Phenol-formaldehyde resin (PF resin, type 72J230_10, by MetaDynea) was used as binder for glass fibres. A solution of PF resin was diluted until a solid content of 5 wt. %, then ammonium sulphate was added as hardener (5 wt. % based on resin solid content).

Example 4: Dry and Wet Strength Test of Glass Fibre Filters with Binder

The aqueous resin compositions of the examples and comparative examples were used as binder for glass fibres and prepared. Bonded glass-fibre products were prepared as follows: Glass fibre filters without any binder (MN 85/70 BF filters, Macherey-Nagel, Germany) were soaked into the aqueous resin compositions of the (comparative) examples or 5 minutes, then the excess of solution was vacuum-filtered, and the impregnated glass fibre filters were cured in the oven between 170° C. and 200° C. for 10 minutes. A blank test (Comparative example 0) was also executed with a fibre filter without any binder. The filters were cut into dog-bone shape having the dimension of 8×1 cm and subjected to tensile testing (Zwick machine Roell Z20) in dry condition and wet condition. For the wet condition, the specimens were soaked into hot water at 80° C. for 3 minutes, and then tested immediately. The amount of binder after curing was determined by weighing before and after. The amount of binder and the measured dry and wet strengths are listed in Table 1.

TABLE 1

Dry and wet tensile strengths test of the aqueous resin compositions

| Binder | Amount of binder (% by weight) | Dry tensile strength (MPa) | Wet tensile strength (MPa) |
|---|---|---|---|
| Example 1: Oxidised cellulose-urea, | 19 | 8.86 | 3.04 |
| Example 2: Oxidised cellulose-melamine, | 17 | 6.46 | 3.78 |
| Example 2a: Oxidised cellulose-melamine-OS | 14.85 | 10.3 | 5.4 |
| Example 3: Oxidised cellulose-dicyandiamide, | 19 | 5.56 | 3.95 |
| Comparative example A: No binder | 0 | 0.49 | — |
| Comparative example B: Oxidised cellulose/no crosslinking agent | 20 | 6.87 | 0.11 |
| Comparative example 1: Oxidised starch-urea | 13 | 5.86 | 0.91 |
| Comparative example 2: Oxidised starch melamine | 16 | 0.43 | 0.1 |
| Comparative example 3: PF resin | 11.7 | 9.8 | 6.3 |

The results demonstrate that the use of the aqueous binder comprising oxidised cellulose and a crosslinker on glass fibres significantly improve the strength of a glass fibre filter and gave significant strength for the use in wet condition.

A SEM picture of the Example 4 can be seen in FIG. 1. It shows that the adhesive is present at the junction of the fibres and thus effectively adhere to the fibres at low binder content to give good strength and maintain porosity of the filter.

The results also demonstrate that the wet strength of the aqueous resin composition of the invention is far better than comparable starch-urea or melamine resin and the aqueous resin composition of the invention provide many advantages over the state-of-the-art PF resins in this application without unacceptable difference in strength.

Example 5: Application for Wood Products

The solution of Example 2 was used as binder for wood and tested with an Automated Bonding Evaluation System (ABES). The solution had a concentration of 20 wt. % (resin solids content), and 20 mg of solution was applied on 5 mm×2 cm area on the edge of a wood strip (Beech, *Fagus Sylvatica* L.) then another strip was overlapped with the same area on the applied solution. The sample was pressed at 150° C. for 1 minute, and immediately tested in shear mode. The maximum load is 175 N with a standard deviation of +/−3. This shows that the binder can be used as an adhesive for wood.

What is claimed is:

1. An aqueous resin composition comprising a resin in water, which resin is a reaction product of an oxidised polysaccharide and a crosslinking agent,
    a) which oxidised polysaccharide is an oxidised cellulose comprising between 3 and 12.2 mmole of aldehyde groups per gram cellulose,
    b) which crosslinking agent comprises two or more groups reactive with the aldehyde groups,
    c) wherein the aldehyde groups in the resin in the aqueous resin composition are in hydrated or un-hydrated form and are at least partly converted to inter- or intramolecular hemiacetals,
    d) wherein the resin is dispersed and/or dissolved but not gelled.

2. The aqueous resin composition according to claim 1, wherein the crosslinking agent is chosen from the group of sorbitol, glycerol, gallic acid, para-methoxy phenol, hydroxylamine hydrochloride, poly-isocyanates or polyamines.

3. The aqueous resin composition according to claim 1, having a resin solids content from 1-25 wt. % defined as the dry solids weight relative to the total weight of the dry resin solids and water.

4. The aqueous resin composition according to claim 1, having a viscosity from 4.5 to 10 mPa*s at a solid content from 5 wt. % to 8 wt. % (measured at 20° C. in an Anton Paar rheometer in rotation mode at 200 $s^{-1}$).

5. The aqueous resin composition according to claim 1, having a ratio in moles between aldehyde groups in the oxidised cellulose and crosslinking groups in the crosslinking agent from 10 to 0.1.

6. The aqueous resin composition according to claim 1, further comprising one or more of the components selected from the group of
    a) organosilane compounds,
    b) hydrophobic agents,
    c) antimicrobial agents,
    d) flame retardants.

7. The aqueous resin composition according to claim 1 having a final pH from 7 to 3.

8. The aqueous resin composition according to claim 1 characterised by a wet tensile strength of at least 1 Mpa in a glass fibre binder test described in the application and/or having a shelf stability defined as viscosity stability characterised by a viscosity between 4.5 to 10 mPa*s and substantially no sedimentation for a period of more than 1 week at a temperature between 4 and 21° C.

9. A process for the preparation of the aqueous resin composition of claim 1, comprising the steps of:
    a) providing oxidised cellulose,
    b) solubilising the oxidised cellulose in water at elevated temperature, optionally followed by removing water or by diluting with water to bring the resulting amount of oxidised cellulose between 1 and 10 wt. % dry oxidised cellulose weight relative to the weight of the aqueous composition,
    c) adding the crosslinker,
    d) raising the temperature to allow the oxidised cellulose and the crosslinker to react and form the resin,
    e) cooling,
    f) optionally adjusting the water content to a resin concentration between 1 and 25 wt. % (dry solid resin weight relative to the total aqueous composition weight),
    g) optionally adding further additives,
    h) optionally adjusting the pH range if needed to a final pH from 7 to 3.

10. A process for the manufacture of fibre-based products comprising fibres and a binder comprising the steps of
    a) contacting fibres with an aqueous resin composition of claim 1,
    b) forming the fibres to a fibre product before or after contacting step a), c) drying and curing the aqueous resin composition to form the binder, wherein the fibres are inorganic fibres selected from the group of stone fibres, glass fibres, rock fibres, slag fibres, and mineral fibres, and wherein the fibre-based products after curing contains between 1 and 20 wt. %, of cured binder.

11. A fibre-based product obtained by a process according to claim 10.

12. The fibre-based product of claim 11 in insulation materials, hydroponic growing media, filters, air filters, sheets or roof shingles.

13. A process for the manufacture of wood or wood-fibre based materials comprising providing the aqueous resin composition of claim 1 as an adhesive for wood or as a binder in wood fibre-based materials.

14. The aqueous resin composition according to claim 1, wherein the oxidised polysaccharide is an oxidised cellulose comprising between 7.4 and 11.1 mmole of aldehyde groups per gram cellulose.

15. The aqueous resin composition according to claim 2, wherein the crosslinking agent is selected from the group of urea, melamine and dicyandiamide.

16. The aqueous resin composition according to claim 2, wherein the crosslinking agent has a weight average molecular weight Mw of at most 1000 g/mol.

17. The aqueous resin composition according to claim 3, having a resin solids content from 2-20 wt. %.

18. The aqueous resin composition according to claim 5, having a ratio in moles between aldehyde groups in the oxidised cellulose and crosslinking groups in the crosslinking agent from 7 and 0.7.

19. The aqueous resin composition according to claim 6, further comprising at least an organosilane compound.

20. The process of claim 9, wherein the oxidised cellulose comprises C2 and C3 aldehydes.

21. The process of claim 9, wherein step b) comprises solubilising the oxidised cellulose in water at elevated temperature
in amount between 5 and 30 ml of water per gram of dry oxidised cellulose,
between 8° and 105° C.,
followed if needed by removing water or by diluting with water to bring the resulting amount of oxidised cellulose between 3 and 8 wt. % dry oxidised cellulose weight relative to the weight of the aqueous composition.

22. The process of claim 9, comprising adding the crosslinker in an amount resulting in a molar ratio between aldehyde groups in the oxidised cellulose and the crosslinking groups in the crosslinking agent between 10 to 0.1.

23. The process of claim 9, comprising raising the temperature in step d) to allow the oxidised cellulose and the crosslinker to react and form the resin at a temperature from 40° C. to 90° C. and at a pH between 2 and 5.

24. The process of claim 9, comprising in step f) adjusting the water content if needed to a resin concentration between 2 and 20 wt. % (dry solid resin weight relative to the total aqueous composition weight).

25. The process of claim 9, wherein the oxidised cellulose provided in step a) comprises between 3 and 12.2 mmole of aldehyde groups per gram cellulose.

26. The process of claim 9, wherein the reaction step d) of the oxidised cellulose and the crosslinking agent is carried out until the viscosity reaches a set value between 4.5 to 10 mPa*s and then the composition is cooled and/or wherein the crosslinker is a polyamine and the reaction step d) of the oxidised cellulose and the polyamine crosslinker is carried out until substantially all primary amino groups have reacted, as determined by FT-IR spectroscopy analysis.

27. The process of claim 17 wherein the wood or woodfibre based materials are MDF, fibreboard, wood laminate materials, laminate beams or multiplex.

* * * * *